(12) United States Patent
Sirmon et al.

(10) Patent No.: US 8,013,806 B2
(45) Date of Patent: Sep. 6, 2011

(54) DISPLAY DEVICE

(75) Inventors: James Sirmon, Middlesex (GB); Anthony Cole, Teddington (GB)

(73) Assignee: Litelogic IP Limited, Surrey (GB)

( * ) Notice: Subject to any disclaimer, the term of this patent is extended or adjusted under 35 U.S.C. 154(b) by 864 days.

(21) Appl. No.: 11/574,122

(22) PCT Filed: Aug. 25, 2005

(86) PCT No.: PCT/GB2005/003313
§ 371 (c)(1), (2), (4) Date: Sep. 28, 2007

(87) PCT Pub. No.: WO2006/021788
PCT Pub. Date: Mar. 2, 2006

(65) Prior Publication Data
US 2008/0094323 A1 Apr. 24, 2008

(30) Foreign Application Priority Data
Aug. 26, 2004 (GB) .................................. 0419071.6

(51) Int. Cl.
*G09G 3/00* (2006.01)
*G09G 3/18* (2006.01)

(52) U.S. Cl. ........................................... 345/31; 345/56

(58) Field of Classification Search .................. 40/432, 40/442, 444; 345/31, 39, 55, 59, 83; 362/234–236, 362/362
See application file for complete search history.

(56) References Cited

U.S. PATENT DOCUMENTS

| | | | |
|---|---|---|---|
| 4,160,973 A | 7/1979 | Berlin, Jr. | |
| 5,003,444 A | 3/1991 | Secka et al. | |
| 5,057,827 A | 10/1991 | Nobile et al. | |
| 5,098,302 A | 3/1992 | Sekiguchi | |
| 5,818,401 A | 10/1998 | Wang | |
| 5,924,870 A | 7/1999 | Brosh et al. | |
| 6,249,998 B1 | 6/2001 | NakaMats | |
| 6,335,714 B1 * | 1/2002 | Wang | 345/82 |
| 6,893,138 B1 * | 5/2005 | Jones | 362/96 |
| 7,030,893 B2 | 4/2006 | Yang | |
| 2002/0021262 A1 | 2/2002 | Remitz | |
| 2004/0046721 A1 | 3/2004 | Yang | |
| 2004/0125601 A1 | 7/2004 | Coates et al. | |
| 2004/0130515 A1 | 7/2004 | Chuang et al. | |

FOREIGN PATENT DOCUMENTS

DE 4424887 1/1995
(Continued)

OTHER PUBLICATIONS

International Search Report for parent PCT application PCT/GB2005/003313, Dec. 14, 2005, 3 pages.

(Continued)

*Primary Examiner* — Kevin M Nguyen

(74) *Attorney, Agent, or Firm* — Nixon & Vanderhye P.C.

(57) ABSTRACT

Image display apparatus comprising two or more arrays of light sources is described. Each array is rotatable around a common axis, and the light sources in each array are arranged so that each light source traverses along a unique path around the common axis. A controller is adapted to modulate the intensity of light emitted by each light source as it traverses its respective unique path such that the light sources in combination cause a desired image to be visible to an observer by virtue of persistence of vision.

31 Claims, 9 Drawing Sheets

FOREIGN PATENT DOCUMENTS

| | | |
|---|---|---|
| EP | 0 208 283 | 1/1987 |
| EP | 0301870 | 2/1989 |
| EP | 0887783 | 12/1998 |
| EP | 1 298 630 | 4/2003 |
| FR | 2800500 | 5/2001 |
| GB | 2280059 | 1/1995 |
| JP | 7-104689 | 4/1995 |
| WO | 90/12354 A2 | 10/1990 |
| WO | WO 97/50070 | 12/1997 |
| WO | 99/12354 | 3/1999 |
| WO | 99/63512 | 12/1999 |
| WO | 01/88890 A2 | 11/2001 |
| WO | 2004/042684 | 5/2004 |

OTHER PUBLICATIONS

Third Party Comments dated May 2, 2008 for EP Application No. 05775383.2-1241.

* cited by examiner

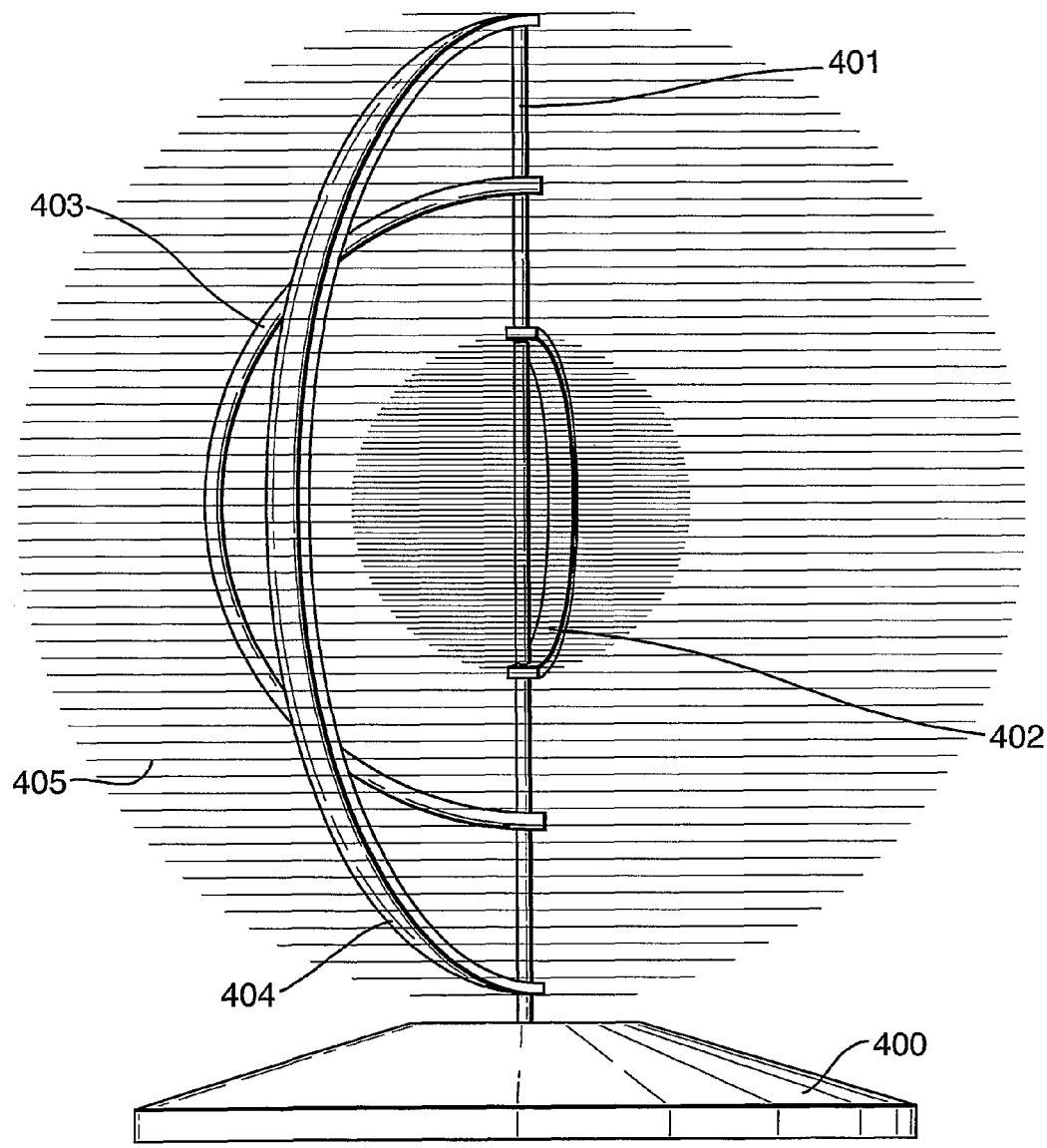

DISPLAY DEVICE

This application is the US national phase of international application PCT/GB05/03313, filed in English on 25 Aug. 2005 which designated the US. PCT/GB05/03313 claims priority to GB Application No. 0419071.6 filed 26 Aug. 2004. The entire contents of these applications are incorporated herein by reference.

This invention relates to a display device having a plurality of moving light sources, of which the intensity of light emitted by each is varied as they move in order to cause an image or message to be visible to an observer by virtue of persistence of vision.

A typical device of this nature comprises a single arm along which are disposed an array of light emitting diodes (LEDs). The arm rotates in a continuous or oscillatory fashion such that each LED traces out a path. The LEDs are individually turned on and off as the arm rotates in such a manner as to cause an observer to see a dot matrix image in the area swept out by the arm.

Such devices may be adapted by incorporating red, green and blue LEDs to display a full colour static or moving picture. This technique is particularly useful since by using a relatively small number of LEDs, it is possible to recreate an image that would normally require several orders of magnitude more LEDs. All that is required is that the arm of LEDs spins sufficiently fast that persistence of vision causes an image to be visible to the observer.

However, there is a problem with this type of display in that to obtain high resolution, the LEDs on the rotating arm must be closely spaced and hence small in size. As a result, the intensity of light emitted by them is low, and often the image is not clearly visible, especially when viewed in strong sunlight. Higher power LEDs are available, but these are much larger, and so it is not possible to arrange these along the arm and maintain the required resolution.

In accordance with one aspect of the present invention, there is provided image display apparatus comprising two or more arrays of light sources, each array being rotatable around a common axis, the light sources in each array being arranged so that each light source traverses along a unique path around the common axis; and a controller adapted to modulate the intensity of light emitted by each light source as it traverses its respective unique path such that the light sources in combination cause a desired image to be visible to an observer by virtue of persistence of vision.

By providing two or more arrays of light sources, each of which traverses a respective unique path, the invention allows larger, brighter light sources to be used without reducing the resolution of the image that is produced. All that is required is that the arrays rotate around the common axis sufficiently quickly. The minimum acceptable rotational speed depends on the ambient light levels and the brightness of the light sources. The apparatus has been found to work at rotational speeds as low as 5 revolutions per second, although image flicker is detectably present at speeds up to about 25 revolutions per second.

The arrays may be linear, and typically each array is rectilinear. In this case, the longitudinal axis of each array may be perpendicular to the common axis, or alternatively, the longitudinal axis of each array may be parallel to the common axis.

When the longitudinal axes of each array are perpendicular to the common axis then the longitudinal axes are typically coplanar.

When the longitudinal axes of each array are parallel to the common axis then the corresponding point on each longitudinal axis may be at the same radial distance from the common axis, and typically, every point on each longitudinal axis will be at the same radial distance from the common axis.

In an alternative embodiment, each array is curved. In this embodiment, the longitudinal axis of each array typically defines an arc. Normally, each arc is semicircular and intersects with the common axis at each of its ends. Preferably, the radius of each arc is different from those of the other arcs.

Each array may comprise a different number of light sources. However, this is inefficient to manufacture, and it is preferable that each array is substantially identical and comprises the same number of light sources.

In a preferred embodiment, the apparatus comprises two arrays, the paths traversed by the light sources of one array appearing interlaced with the paths traversed by the light sources of the other array when viewed along a direction normal to the common axis.

Clearly, when the light sources of one array traverse the same surface as those of the other array, then they will always appear to be interlaced with each other, and the viewing direction is immaterial. However, if the light sources of one array traverse a different surface to those of the other array then they will only appear interlaced when viewed along a direction normal to the common axis due to parallax.

The term interlaced is used in this specification in the sense that it is commonly used in television technology. That is to refer to the alternate scanning of an image in two sets of alternate lines.

Normally, each array is disposed at a fixed position relative to the other arrays, and all the arrays rotate in unison.

Typically, each array of light sources is mounted on a respective printed circuit board (PCB). Each PCB is normally mounted on a rotatable shaft and is co-axial with the common axis. In this case, the rotatable shaft has a central bore through which image data is transmitted to the controller from an external data source via a visible light or infrared link comprising a transmitter disposed at one end of the bore and a corresponding receiver connected to the controller and disposed within the bore at a position distal from the transmitter.

In a preferred embodiment, each light source is arranged in a triad of a red, a green, and a blue light source. Typically, each light source is a light emitting diode (LED).

As an alternative, each light source may be a tricolour LED. In either case, the light source or triad of light sources may be controllable to emit light of a chosen colour.

The adjacent unique paths may or may not overlap.

The controller typically comprises a plurality of pulse width modulators, each of which is connected to a respective light source, and is responsive to an input signal to modulate the intensity of light emitted by each light source.

Each pulse width modulator may be further adapted, if the light sources are controllable to emit light of a chosen colour, to control the colour emitted by the light source in response to the input signal.

The image display apparatus may further comprise at least one radially movable balancing weight, a vibration sensor and a balance controller adapted to vary the radial distance of the balancing weight from the common axis in response to a signal received from the vibration sensor. The vibration sensor is disposed at the common axis.

In accordance with a second aspect of the invention, a display system comprises a plurality of image display apparatus according to the first aspect of the invention, wherein the arrays of the plurality of image display apparatus are configured to rotate around the common axes in synchrony such that the desired images caused to be visible by each apparatus together form a composite image.

If the longitudinal axes of each array are parallel to their respective common axis then the common axes may lie in a common plane. In this case, the common axes typically lie in a row in the common plane.

Alternatively, if the longitudinal axes of each array are perpendicular to their respective common axis then the common axes may lie perpendicular to a common plane.

Typically, the arrays of each image display apparatus are attached to a respective shaft lying on the common axis, and the shafts of each apparatus are coupled together by way of a gear arrangement.

Preferably, each shaft is disposed relative to the shafts of adjacent display apparatus such that the volume of rotation described by the arrays attached thereto overlaps with the volume of rotation described by the arrays attached to the shafts of the adjacent display apparatus, and the two arrays are disposed about their respective shaft such that they do not collide with the arrays of adjacent displays as they rotate. This allows the composite image to appear continuous to a viewer.

Embodiments of the invention will now be described with reference to the accompanying drawings, in which:

FIG. 9 shows a third embodiment of the invention.

Figure 1:
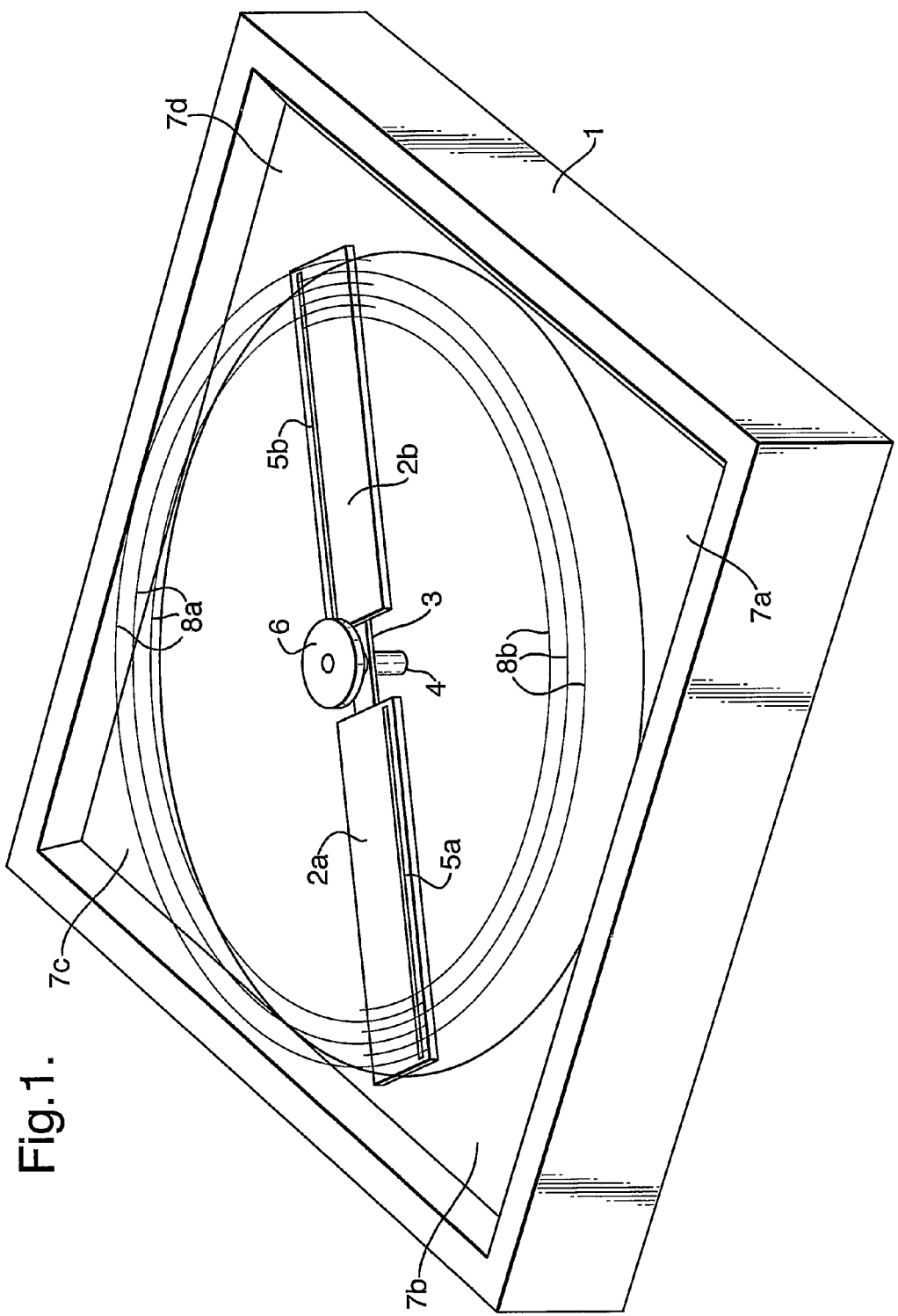
FIG. 1 shows a perspective view of a first embodiment of the invention.

FIG. 1 shows a housing 1 which contains two identical PCBs 2a, 2b. The two PCBs 2a and 2b are mounted on opposite ends of an arm 3 that is connected to a shaft 4 driven by a motor (not shown).

Figure 4:
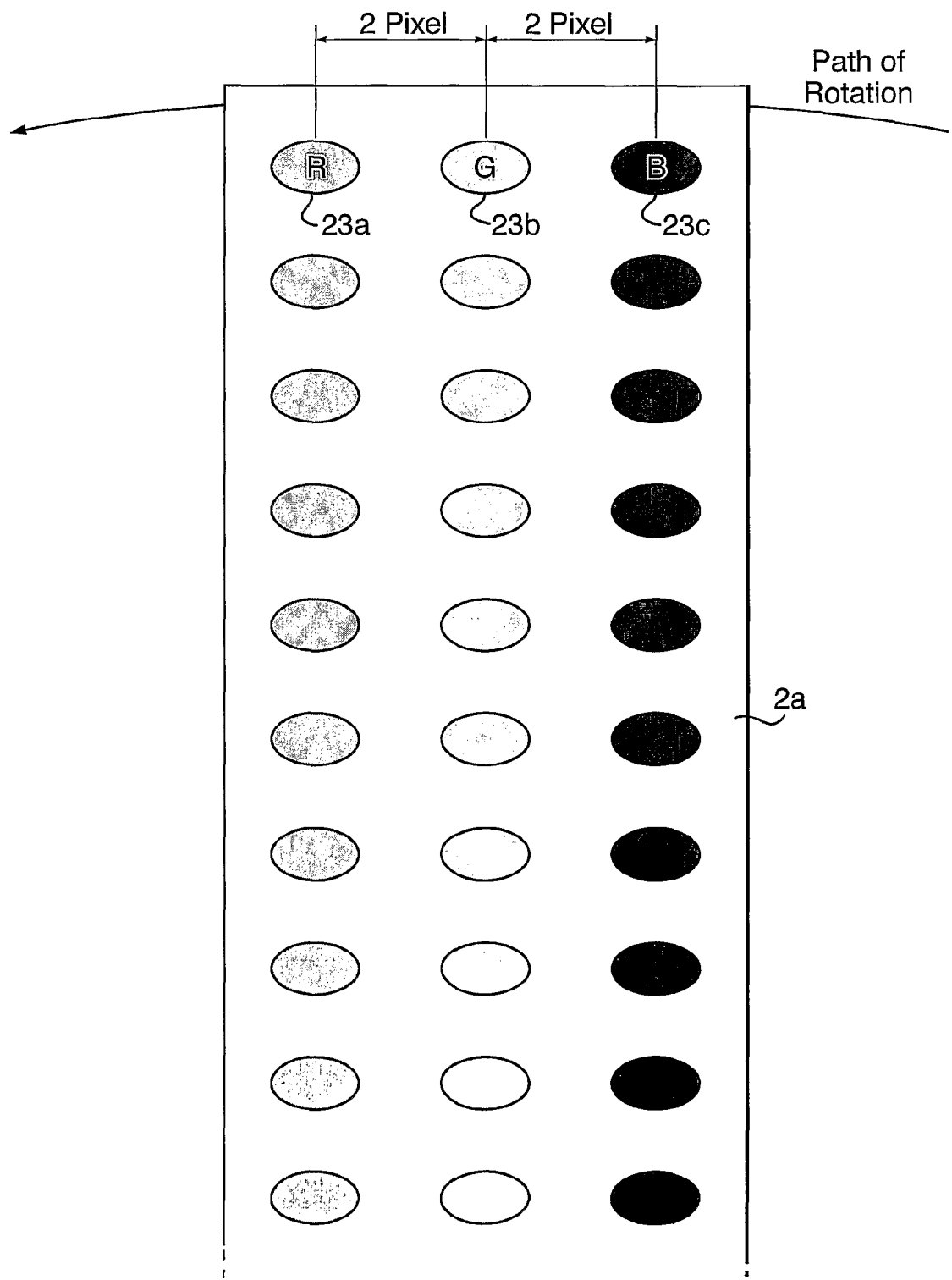
FIG. 4 shows the arrangement of LEDs on a PCB.

Each PCB 2a, 2b carries a respective array 5a and 5b of LEDs. Each array 5a, 5b comprises individual triads of red, green and blue LEDs. FIG. 4 shows the arrangements of these triads. As can be seen, each triad comprises a red LED 23a, a green LED 23b, and a blue LED 23c arranged in a row along the path of rotation of the LEDs 23a, 23b and 23c. Each LED 23a, 23b and 23c in a triad is separated from the adjacent LEDs 23a, 23b and 23c in the triad by a pitch of 2 pixels. The size of the pixel is determined by the length of time that the LEDs 23a, 23b and 23c are energised as the PCB 2a, 2b rotates. This length of time is controlled by a controller (described later). The 2 pixel spacing is sufficient to allow large, bright LEDs to be mounted on the PCBs 2a, 2b.

In order that the displayed image is correct, the red, green and blue components of the image are offset from each other by 2 pixels such that the components all appear to emanate from the same, correct source. This offset may be provided either by modifying the image data supplied to the controller, or by the controller itself acting on the image data.

When the PCBs 2a, 2b are caused to rotate, the red, green and blue LEDs 23a, 23b and 23c of each triad are individually activated in order to cause light of a desired colour to be emitted at any point of the circular path described by the triad of LEDs as it rotates. Thus, by simultaneously controlling the light emitted by the individual triads of LEDs 23a, 23b and 23c, it is possible to generate an image that is visible to a user by virtue of persistence of vision. In order for this effect to take place, the PCBs 2a, 2b must be rotated sufficiently quickly, for example, 25 revolutions per second or faster.

However, there is a region towards the centre of arm 3 where the linear velocity of the PCBs 2a, 2b is not sufficient for persistence of vision to cause an image to appear. As such, there is provided a small static LED display 6 that provides an image in this region. Furthermore, it is normally desired to have a rectangular rather than a circular image, and so four peripheral displays 7a, 7b, 7c and 7d are provided to fill in the regions in the corners of housing 1 in which it is not possible to display an image using the PCBs 2a and 2b.

As each PCB 2a, 2b rotates, the triads of red, green and blue LEDs each describe a unique path. For example, certain triads of LEDs on PCB 2a describes paths 8a whilst certain triads on PCB 2b describe the paths 8b. As can be seen, the paths 8a interlace with the paths 8b. Therefore, a certain resolution is achieved without having to densely pack the LEDs on a single PCB. Instead, the arrays of LEDs 5a and 5b are distributed on two PCBs 2a, 2b allowing larger and brighter LEDs to be used. The rotational motion of the PCBs 2a, 2b through the air has the additional advantage of providing cooling for the LEDs.

Figure 2:
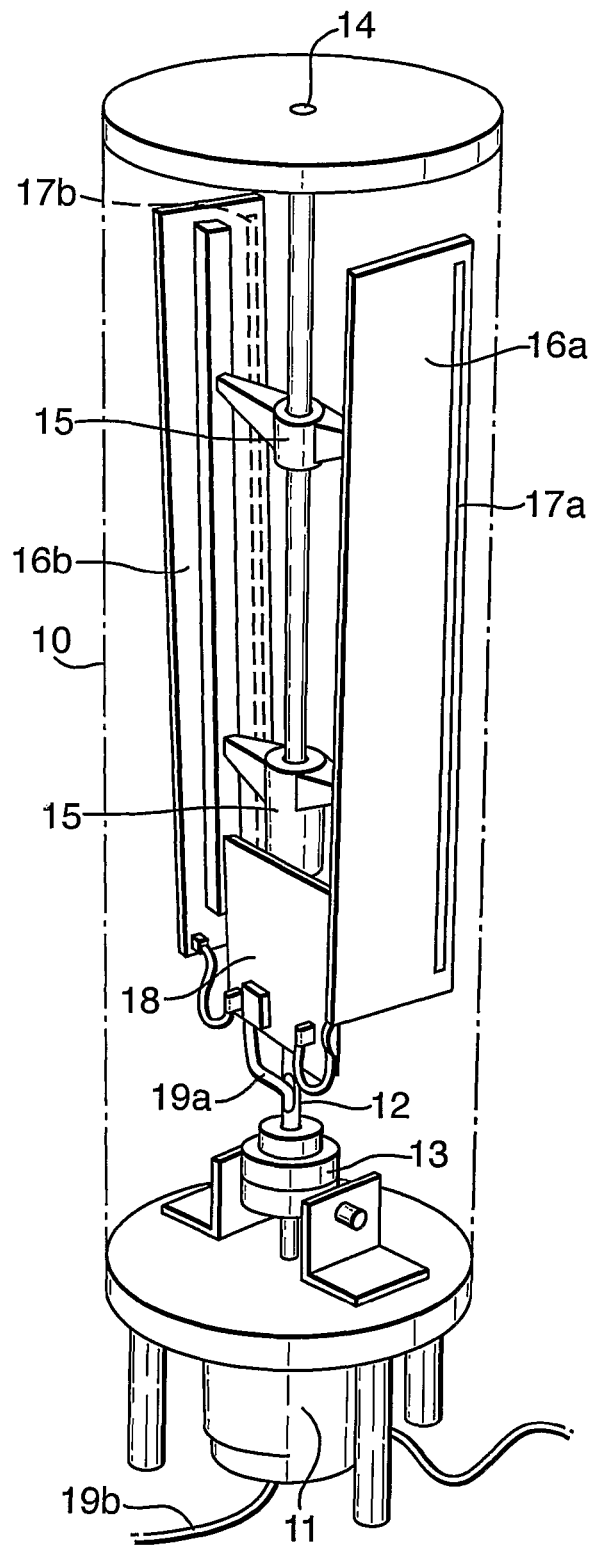
FIG. 2 shows a perspective view of a second embodiment of the invention.

In the second embodiment shown in FIG. 2, the display device is housed in an optional perspex enclosure 10 at the base of which is mounted an AC motor 11. The armature of this AC motor 11 is connected to a shaft 12 which runs the length of housing 10 through slip rings 13 and is supported in a bearing 14 in the top of the housing 10. The slip rings are used to supply power to the rotating PCBs 16a, 16b.

On shaft 12 are mounted two support arms 15, which support two diametrically opposing PCBs 16a, 16b. Each of these PCBs 16a, 16b carries respective arrays of LEDs 17a, 17b (in this view, the LED array 17b on PCB 16b is not visible). These PCBs 16a, 16b are similar to those described with respect to the embodiment of FIG. 1, and each array of LEDs 17a, 17b carries triads of red, green and blue LEDs arranged such that the paths described by the triads in array 17a interlace with those of the paths described by the triads on array 17b as the two PCBs 16a, 16b rotate around shaft 12. The resultant image therefore has a cylindrical aspect to it and is viewed through the housing 10. The triads of LEDs are also arranged in rows as already described and shown in FIG. 4.

Each of the PCBs 16a, 16b is connected to a controller PCB 18 which receives image data through an optic fibre 19a optically coupled with a receiver at one end of a hole bored down the centre of shaft 12. At the other end of the hole a transmitter is optically coupled with another optic fibre 19b. Image data can thus be transmitted between the optic fibres 19a and 19b using the hole as a light guide.

Figure 6:
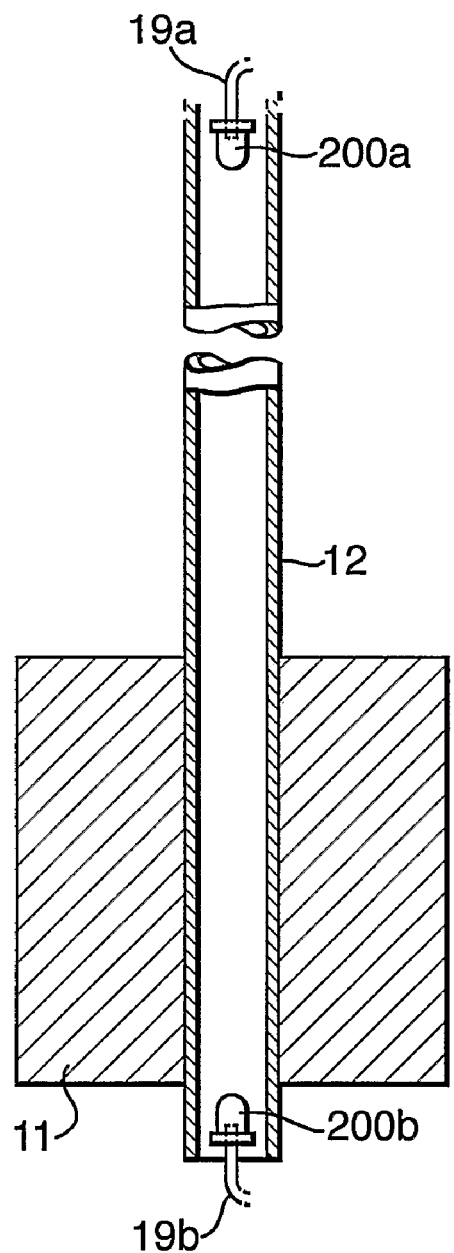
FIG. 6 shows one way of providing data to the controller.

FIG. 6 shows a cross-section through the shaft 12 and motor 11. This reveals the transmitter 200b attached to optic fibre 19b and receiver 200a attached to optic fibre 19a. Image data is normally transmitted between the transmitter and receiver down the shaft 12 as infrared radiation, but of course optical radiation may be used instead. The transmitter 200b is loosely fitted in shaft 12 so that shaft 12 is free to rotate around it.

A controller PCB is also provided in the embodiment of FIG. 1. However, the PCB is not visible in the view of FIG. 1. The image data may be transferred to the controller PCB in the FIG. 1 embodiment in the same manner as that shown in FIG. 6 and described above.

Figure 3:
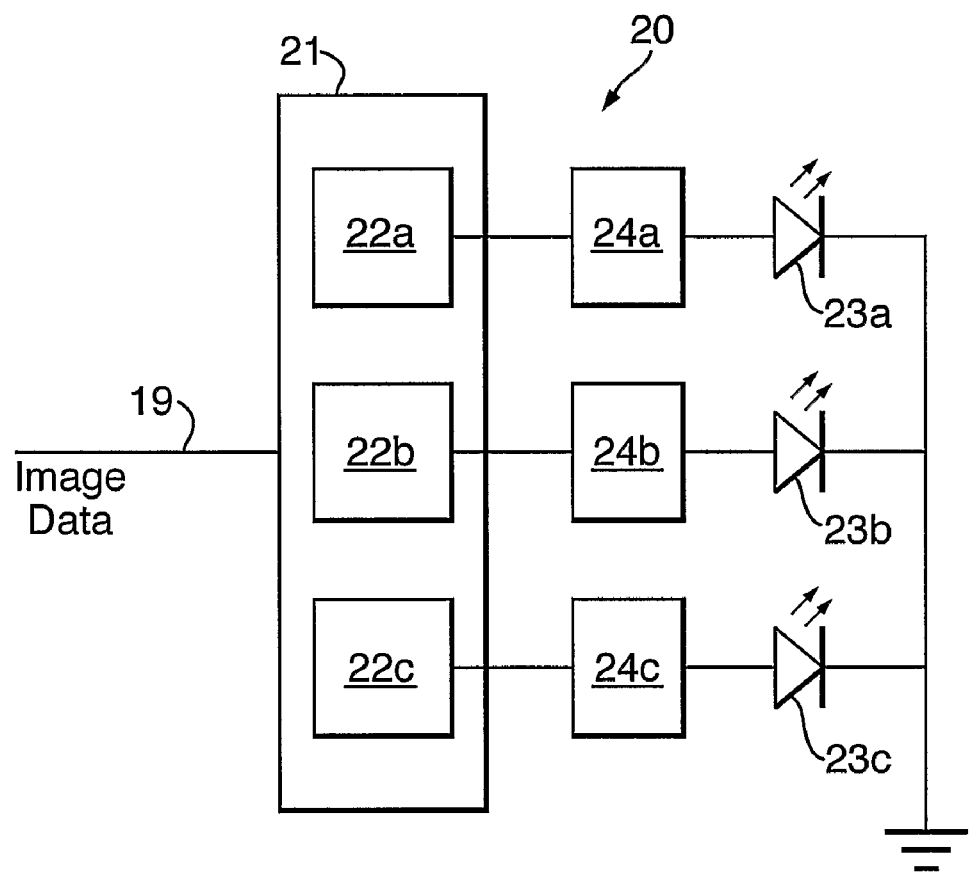
FIG. 3 shows a controller suitable for use with the first and second embodiments.

A schematic representation of suitable controller electronics 20, situated on the controller PCB 18, for one of the triads in an array 5a, 5b, 17a, 17b is shown in FIG. 3. Image data is received via a fibre optic 19 by a controller 21 which may be made from discrete components, or be a suitably programmed microprocessor or field programmable gate array (FPGA). The image data contains information relating to the intensity that each LED within the triad is required to produce. Each triad has an associated controller 21, within which there are provided three discrete pulse width modulation (PWM) controllers 22a, 22b and 22c. These are connected to respective red, green and blue LEDs 23a, 23b and 23c forming one of the triads via LED drivers 24a, 24b and 24c. The LED drivers 24a, 24b and 24c convert the output signals from the PWM controllers 22a, 22b and 22c into high power signals for driving the LEDs 23a, 23b and 23c.

The PWM controllers 22a, 22b and 22c are responsive to the image data to produce pulse width modulated outputs for controlling the brightness of each LED 23a, 23b and 23c such that each emits the desired intensity of light. As previously explained, the red, green and blue components of the image data are offset from each other. Thus, when viewed by a distal observer, the colours produced by each LED 23a, 23b and 23c converge and the triad appears to be a point light source emitting light of the desired colour and brightness.

Thus, by varying the input data supplied to the controller 21 as the PCBs 2a, 2b or 16a, 16b rotate, it is possible to cause the devices to display a desired fixed or moving image. Obviously the device shown in FIG. 1 will produce a flat image whilst that in FIG. 2 is formed on the surface of a cylinder.

As already mentioned in the first embodiment, those triads in the arrays 5a, 5b nearest to shaft 4 have a lower linear velocity than those furthest away from shaft 4. As such, if each LED in the array 5a, 5b is energised for the same length of time in order to display a pixel then the pixels closest to the shaft 4 will be smaller than those furthest away from the shaft 4. This can be compensated by adjusting the length that the LEDs of a particular triad are energised for depending on the radial distance of the triad from the shaft 4. If this is done, then each pixel may be the same size, irrespective of its radial distance from the shaft 4.

Furthermore, since the circumference of the circular paths described by the LEDs closest to the shaft 4 are smaller than those furthest from the shaft 4, there are fewer pixels in the paths closest to the shaft 4 than there are in those furthest away from the shaft 4. This can be compensated for by calculating how many pixels are available on each of the circular paths described by each LED and remapping the image data to fit the available number of pixels.

It will be appreciated that although embodiments have been described having only two arms, it is equally feasible to operate the invention with a greater number of arms, each having an associated array of LEDs. In fact, more arms may be provided in order to achieve an arbitrarily high resolution of display. Furthermore, the speed at which the arms must be rotated is lower with a greater number of arms. In one particular embodiment there are eight arms rotating at a rate of 10 Hertz, and this provides a video refresh rate of 80 Hertz which is particularly suitable for displaying moving images.

The apparatus of either embodiment may be used for the display of static and moving images, for example from a television or video signal. The device of the first embodiment is particularly suited for this and is useful in advertising and other applications. The device of the second embodiment also has uses in product promotion where it can be used, for example, to render a representation of a drink can.

Since the PCBs containing the LEDs may be rotating at high speed, it is possible that the system may undergo a large amount of vibration if it is out of balance. Hence, it is proposed to provide a set of balancing weights adjacent to each PCB that can be moved, for example by a motor, towards or away from the axis of shaft 4 in order to compensate for the imbalance.

Figure 5:
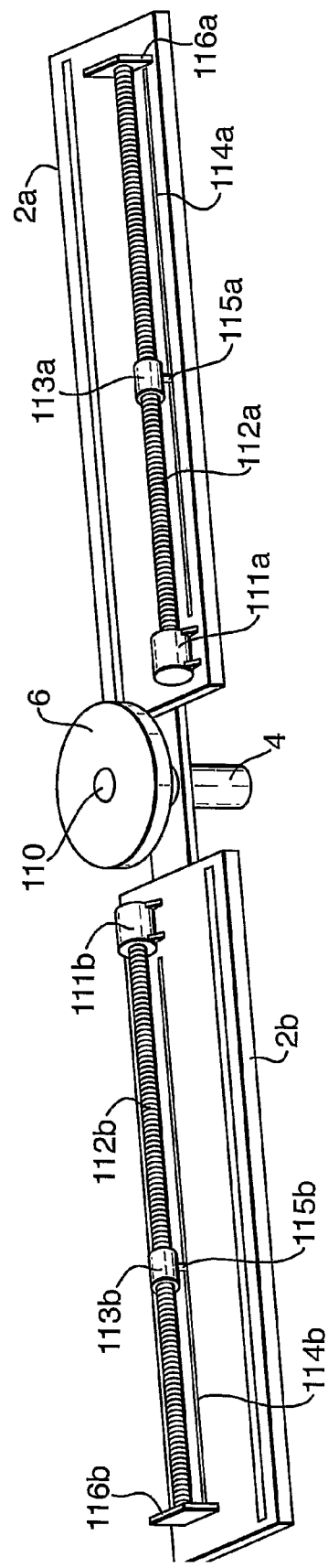
FIG. 5 shows a balancing mechanism.

Such a system is shown in FIG. 5 in which a vibration sensor 110 is fitted to the centre of the central static display 6. A controller (not shown) receives signals from this vibration sensor 110, and in response provides output signals to a pair of stepper motors 111, each of which is mounted on a respective one of the PCBs 2a, 2b. The stepper motors are connected to respective worm drives 112a and 112b on which are mounted counter-balances 113a and 113b. A rail 114a, 114b is provided adjacent to each worm drive 112a, 112b, and each rail 114a, 114b co-operates with a lug 115a, 115b on each counter-balance 113a, 113b to prevent the counter-balance 113a, 113b from rotating so that on operation of the stepper motors 111a and 111b the counter-balance moves along the worm drives 112a, 112b in a radial direction with respect to the shaft 4. End plates 116a, 116b prevent the counter-balances 113a, 113b from being driven off the end of the worm drives 112a and 112b. The controller provides the stepper motors 111a, 111b with drive signals in response to vibrations detected by the vibration sensor 110. By positioning the counter-balances 113a, 113b at the correct radial distance along respective worm drives 112a, 112b, it is possible to reduce the vibration caused by the high speed rotation.

Figure 7:
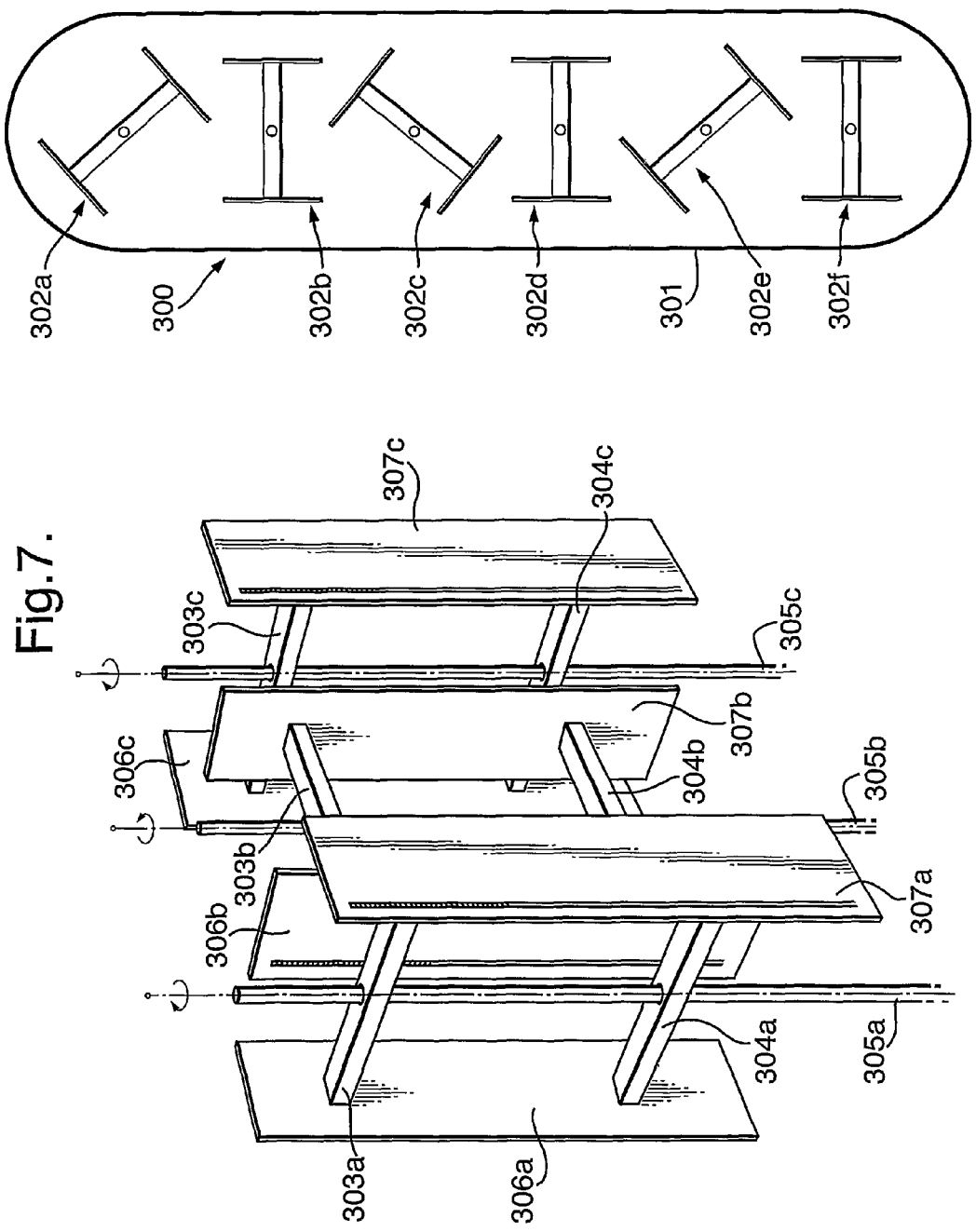
FIGS. 7 and 8 show a display system formed from a plurality of devices according to the second embodiment.
Figure 8:
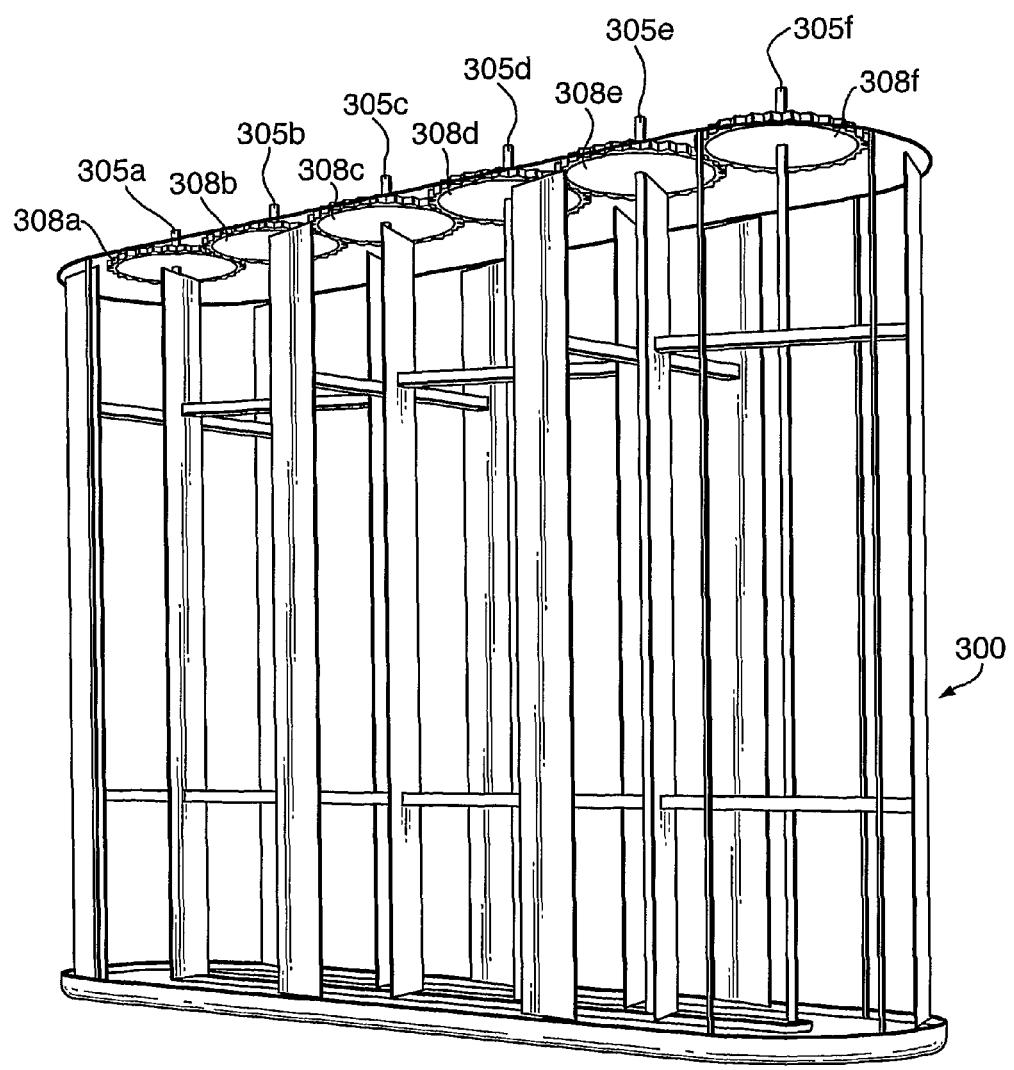

FIGS. 7 and 8 show a display system 300, comprising a transparent enclosure 301 made for example from perspex. Within the enclosure 301 are six displays 302a-302f according to the second embodiment described with reference to FIG. 2, although this quantity is arbitrary and more or fewer displays may be provided.

Three of these displays 302a-302c are also shown in a perspective view in FIG. 7. The remaining three displays 302d-302f are not shown in this view for clarity. However, the structure of each of the displays 302a-302f is identical. As can be seen from this, each display 302a-302c has a corresponding upper arm 303a-303c and lower arm 304a-304c, each mounted on a corresponding shaft 305a-305c. A pair of arrays are attached at opposite ends of each of the upper and lower arms. For example, arrays 306a and 307a are attached to opposite ends of upper arm 303a and lower arm 304a. Each array 306a-306c is offset by half a pixel with respect to its corresponding array 307a-307c as previously described.

All of the displays 302a-302f are coupled together by a suitable non-slipping coupling, such as the gear arrangement shown in FIG. 8. Here a respective gear 308a-308f is attached to one end of each shaft 305a-305f, and each gear meshes with the gear attached to the neighbouring display 302a-302f. Thus, all of the displays may be driven from a single motor in synchrony.

Each upper arm 303a-303f and lower arm 304a-304f is mounted on its respective shaft 305a-305f such that they are always at an orientation that is offset from the adjacent upper and lower arms (i.e. each pair of arrays is disposed about its respective shaft such that they do not collide with the arrays of adjacent displays as they rotate). The purpose of this is to allow the shafts 305a-305f (and hence arrays 306a-306f and 307a-307f) of each display 302a-302f to be closely spaced (i.e. the volume of rotation described by each pair of arrays as they rotate overlaps or intersects the volume of rotation described by the pairs of arrays on adjacent displays) such that a continuous composite image may be created from the images generated by each individual display but without collision between neighbouring arrays as they rotate.

As before, by spinning the displays 302a-302f fast enough and modulating the intensity of light emitted by the light sources on them as they rotate, each display can be caused to generate an image. This brings about a composite image which may be viewed around the entire perimeter of the enclosure 301. This display system 300 finds particular use in advertising and other large-scale display systems, where before the cost of providing a large display using LEDs or the like was prohibitive.

FIG. 9 shows a third embodiment of the invention. In this a base 400 houses a motor (not shown). The motor drives a shaft 401, to which are attached three semi-circular arrays 402, 403, 404. The array 402, 403 and 404 each have different radii, and thus describe spheres of different radii as they rotate. The sphere 405 that is described by arm 404 is shown.

As before, a plurality of light sources such as LEDs (which may be singular or in triads or indeed other configurations) are spaced along the arms. The intensity of light emitted by these may be modulated as the arrays 402, 403 and 404 rotate and thus each array can create an image on the surface of the sphere that it describes. In this case, three such images can be created, and this produces a genuine 3-dimensional effect. There are various applications for this, but one possibility is to produce a representation of the Earth in which the outer arrays 404 and 403 produce images of clouds and the inner array 402 produces an image of the Earth itself.

It is normally intended that the composite image should be viewed from a direction normal to the longitudinal axis of the shaft 401 to avoid any parallax that may be caused by the fact that each array 402, 403 and 404 is generating an image on different surfaces. Of course, it is possible to construct a similar device in which the arrays have the same radii, but with the light sources offset with respect to each other, thereby increasing the resolution beyond that previously possible (as in the previous embodiments). In this case, each array will create its image on the same surface and no parallax will occur.

The invention claimed is:

1. A display system comprising a plurality of image display devices, each image display device comprising;
   at least two arrays of light sources, each array having a plurality of light sources and rotatable around a common axis, the light sources in each array configured so that each light source traverses along a unique path around the common axis; and
   a controller configured to modulate the intensity of light emitted by each light source as it traverses its respective unique path such that the light sources in combination cause a desired image to be visible to an observer by virtue of persistence of vision, wherein the arrays of the plurality of image display devices are configured to rotate around the common axes in synchrony such that the desired images caused to be visible by each display device together form a composite image.

2. A display system according to claim 1, wherein each array is linear.

3. A display system according to claim 2, wherein each array is rectilinear.

4. A display system according to claim 2, wherein for each display device a longitudinal axis of each array is perpendicular to the common axis.

5. A display system according to claim 2, wherein for each display device a longitudinal axis of each array is parallel to the common axis.

6. A display system according to claim 4, wherein for each display device the longitudinal axes of the two arrays are coplanar.

7. A display system according to claim 5, wherein for each display device corresponding points on the longitudinal axis of each array are at the same radial distance from the common axis.

8. A display system according to claim 7, wherein for each display device every point on the longitudinal axes of each array lies at the same radial distance from the common axis.

9. A display system according to claim 1, wherein each array is curved.

10. A display system according to claim 9, wherein the longitudinal axis of each array defines an arc.

11. A display system according to claim 10, wherein for each display device each arc is semicircular and intersects with the common axis at each of its ends.

12. A display system according to claim 10, wherein for each display device the radius of each arc is different from those of the other arcs.

13. A display system according to claim 1, wherein each array comprises the same number of light sources.

14. A display system according to claim 1, wherein for each display device each array is disposed at a fixed position relative to the other arrays, and all the arrays rotate in unison.

15. A display system according claim 1, wherein each array of light sources is mounted on a respective printed circuit board (PCB).

16. according to claim 15, wherein for each display device each PCB is mounted on a rotatable shaft that is co-axial with the common axis.

17. A display system according to claim 1, wherein each light source is arranged in a triad of a red, a green, and a blue light source.

18. A display system according to claim 1, wherein the light sources are light emitting diodes (LEDs).

19. A display system according to claim 1, wherein each light source is a tricolour LED.

20. A display system according to claim 1, wherein each light source is controllable to emit light of a chosen colour.

21. A display system according to claim 1, wherein the controller comprises a plurality of pulse width modulators, each of which is connected to a respective light source, and is responsive to an input signal to modulate the intensity of light emitted by each light source.

22. A display system according to claim 21, wherein each pulse width modulator is further adapted to control a colour emitted by the light source in response to the input signal.

23. A display system according to claim 1, wherein the common axes lie in a common plane.

24. A display system according to claim 23, wherein the common axes lie in a row in the common plane.

25. A display system according to claim 1, wherein the common axes lie perpendicular to a common plane.

26. A display system according to claim 1, wherein the arrays of each image display apparatus are attached to a respective shaft lying on a common axis, and the axles of each apparatus are coupled together by way of a gear arrangement.

27. A display system according to claim 26, wherein each shaft is disposed relative to the shafts of adjacent display apparatus such that the volume of rotation described by the arrays attached thereto overlaps with the volume of rotation described by the arrays attached to the shafts of the adjacent display apparatus, and the two arrays are disposed about their respective shaft such that they do not collide with the arrays of adjacent displays as they rotate.

28. A display system according to claim 1, wherein for each display device the paths traversed by the light sources of each array are interlaced.

29. Image display apparatus comprising two or more arrays of light sources, each array being rotatable around a common axis, the light sources in each array being arranged so that each light source traverses along a unique path around the common axis, whereby the paths traversed by the light sources of each array are interlaced; and a controller adapted to modulate the intensity of light emitted by each light source as it traverses its respective unique path such that the light sources in combination cause a desired image to be visible to an observer by virtue of persistence of vision, wherein each array of light sources is mounted on a respective printed circuit board (PCB), wherein each PCB is mounted on a rotatable shaft that is co-axial with the common axis, wherein for each display device the rotatable shaft has a central bore through which image data is transmitted to the controller from an external data source via a visible light or infrared link comprising a transmitter disposed at one end of the bore and a corresponding receiver connected to the controller and disposed within the bore at a position distal from the transmitter.

30. Image display apparatus comprising two or more arrays of light sources, each array being rotatable around a common axis, the light sources in each array being arranged so that each light source traverses along a unique path around the common axis, whereby the paths traversed by the light sources of each array are interlaced; and a controller adapted to modulate the intensity of light emitted by each light source as it traverses its respective unique path such that the light sources in combination cause a desired image to be visible to an observer by virtue of persistence of vision, further comprising at least one radially movable balancing weight, a vibration sensor and a balance controller adapted to vary the radial distance of the balancing weight from the common axis in response to a signal received from the vibration sensor.

31. Image display apparatus according to claim 30, wherein for each display apparatus the vibration sensor is disposed at the common axis.

* * * * *